O. D. EASTMAN AND W. M. GREGG.
DIRIGIBLE LIGHTING MECHANISM.
APPLICATION FILED NOV. 13, 1919.
1,380,367.
Patented June 7, 1921.
4 SHEETS—SHEET 3.
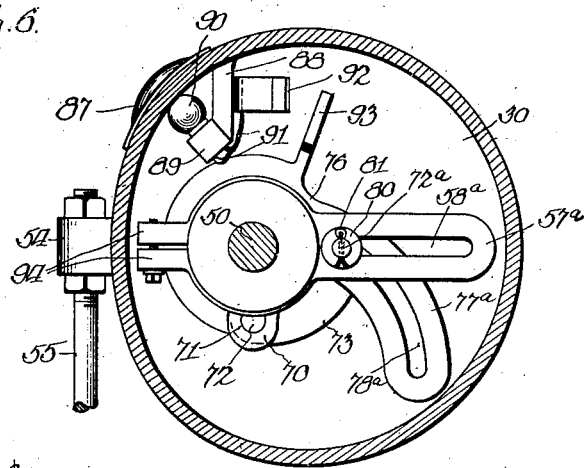
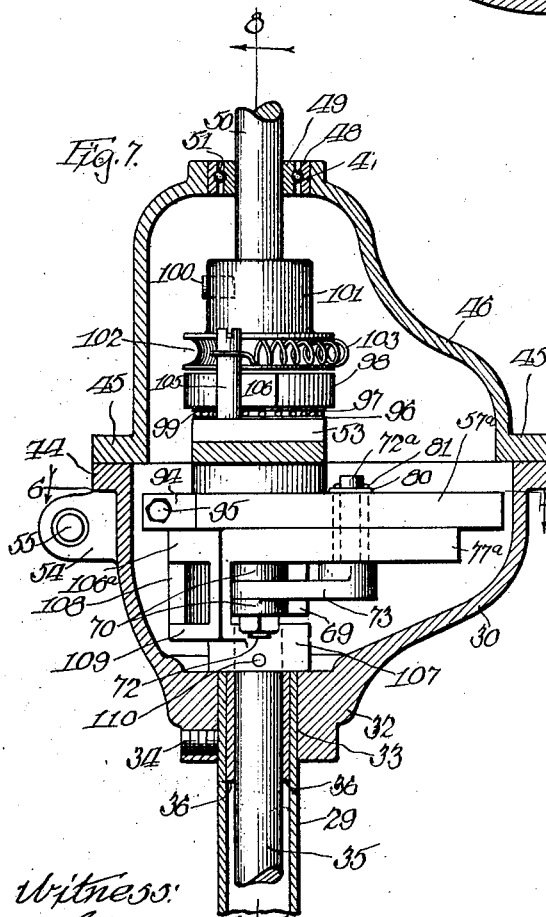
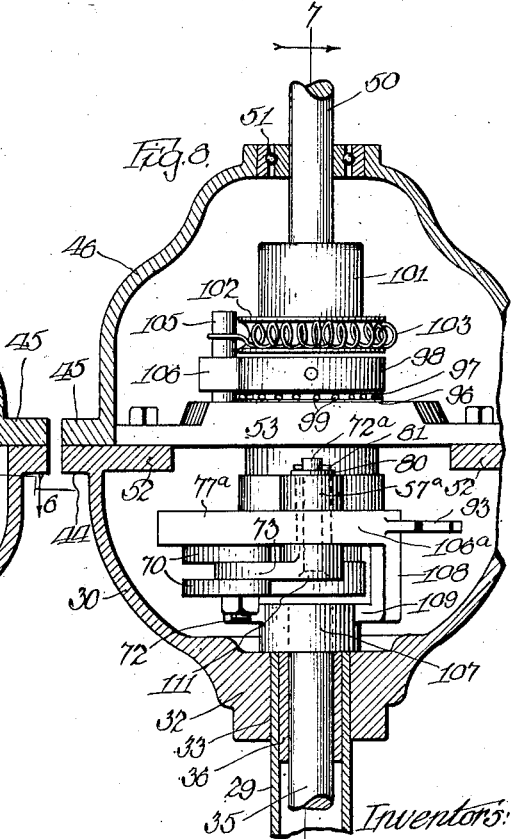

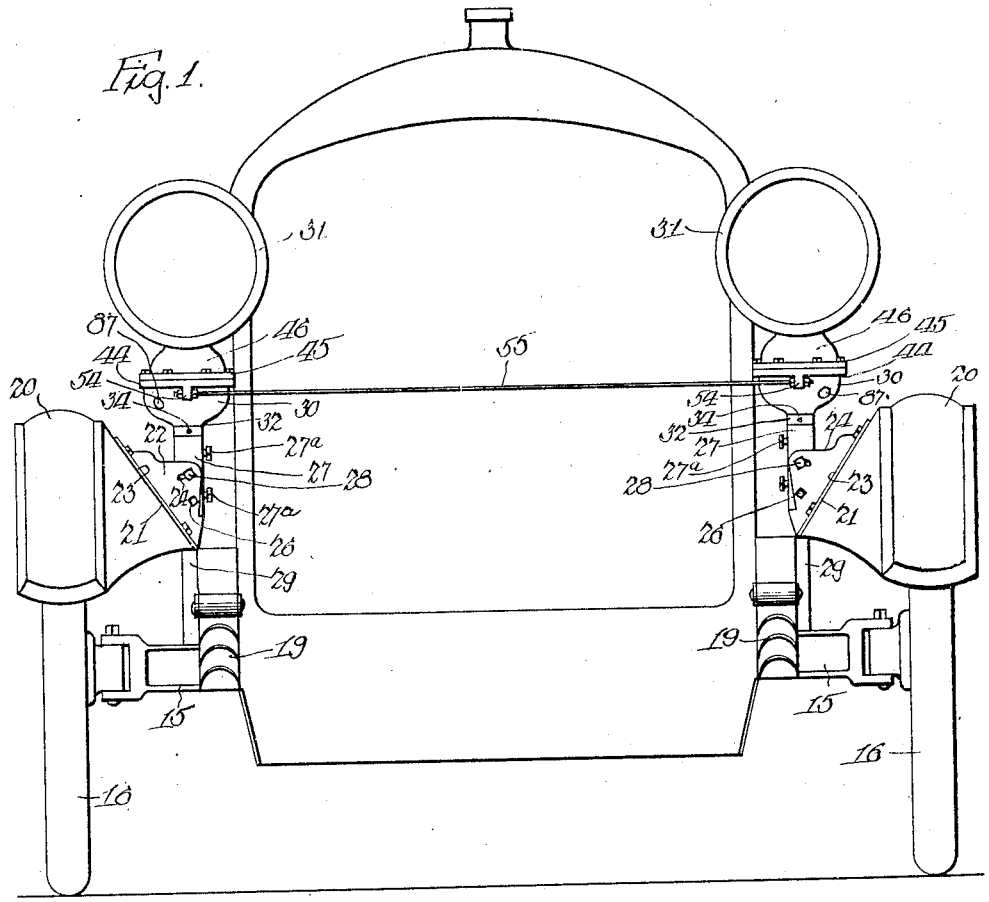

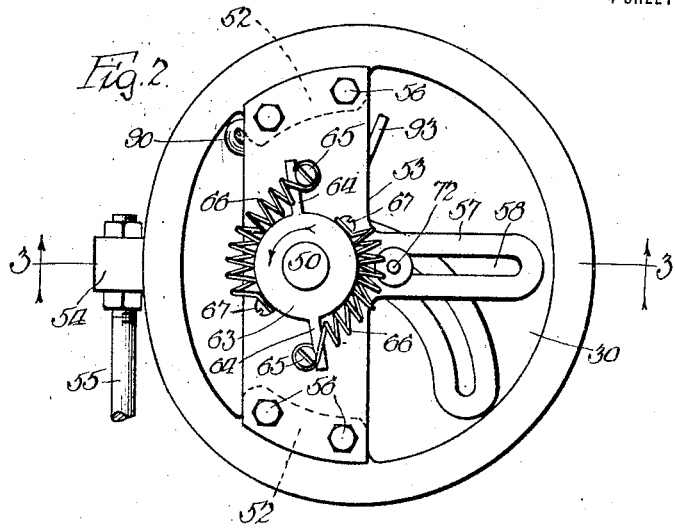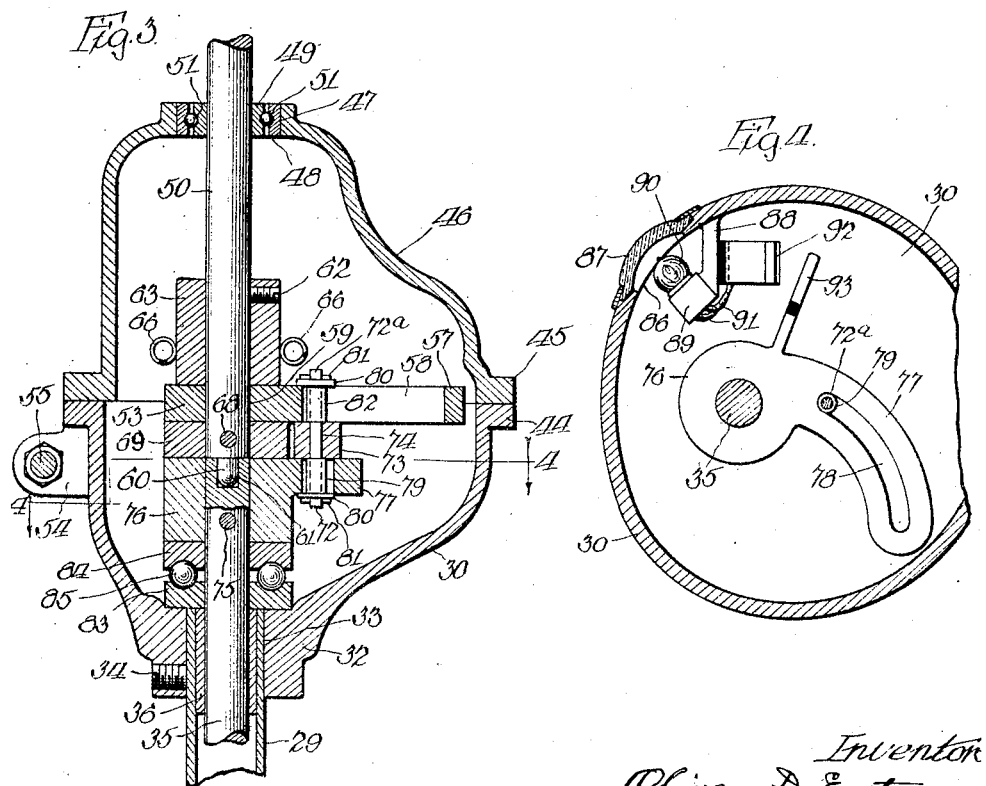

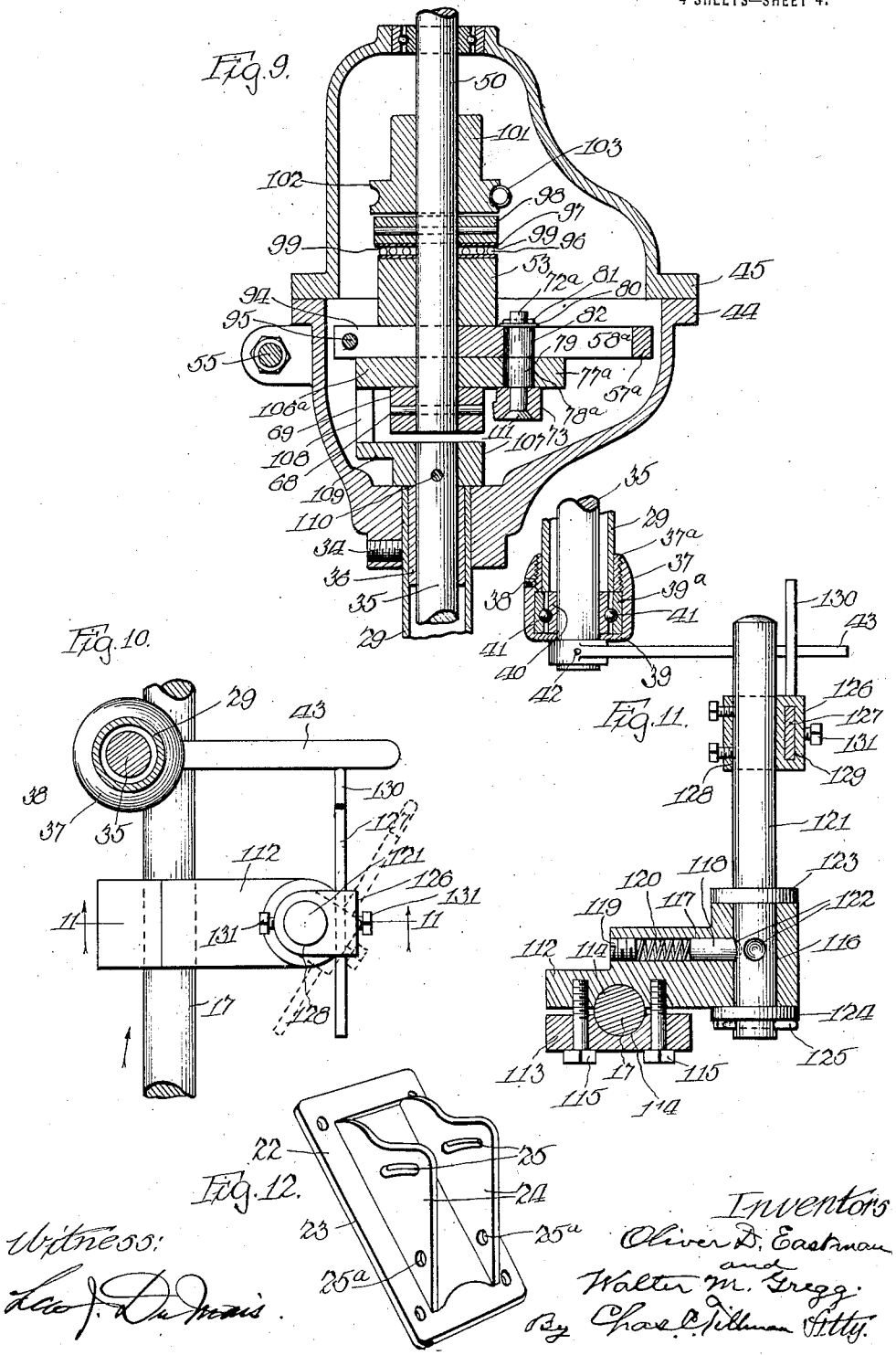

UNITED STATES PATENT OFFICE.

OLIVER D. EASTMAN AND WALTER M. GREGG, OF MUSKEGON, MICHIGAN.

DIRIGIBLE LIGHTING MECHANISM.

1,380,367.  Specification of Letters Patent.  Patented June 7, 1921.

Application filed November 13, 1919. Serial No. 337,814.

*To all whom it may concern:*

Be it known that we, OLIVER D. EASTMAN and WALTER M. GREGG, citizens of the United States, residing at Muskegon, in the county of Muskegon and State of Michigan, have invented certain new and useful Improvements in a Dirigible Lighting Mechanism, of which the following is a specification.

This invention relates to improvements in dirigible lighting mechanism for automobiles and the like of a type somewhat similar to that disclosed in Letters Patent of the United States No. 1,324,651, issued to us on the 9th day of December, 1919, and has for its principal objects substantially the same objects as that set forth in our aforesaid patent, to wit: to provide a mechanism for controlling and directing the rays of light of headlight lamps by connection with and operation of the steering apparatus of an automobile, which shall be simple and inexpensive in construction, strong, durable, efficient and substantially noiseless in operation, the parts of which shall be so made and arranged as not likely to get out of order through use.

A further object of the invention is to provide a mechanism by which, when used on automobiles, the rays of light from the headlight lamp thereof may be directed to the front of the machine or to any desired angle.

Still another object of our present invention is to provide means for housing or incasing and locating the main parts of the mechanism in such a manner and in such positions as to prevent them, in their operation, being interfered with by the accumulation thereon of mud, grit, sand and the like.

A still further object of the present invention is to furnish in conjunction with our dirigible lighting mechanism, automatically operated danger signaling means which will become effective and discernible at the initial turning movement of the headlight lamps and somewhat in advance of the rays of light therefrom.

Various other objects and advantages of the invention will be disclosed in the following description and explanation.

The invention consists in certain novel features and peculiarities in the construction, new arrangement, combination and operation of the various parts thereof as will be hereinafter more fully set forth and specifically claimed.

In the accompanying drawings, which serve to illustrate an embodiment of the invention—

Figure 1 is a front face view of an automobile showing a head-light lamp equipped with our improved dirigible mechanism mounted on each side of the front portion of the automobile with the lamps located in their normal positions.

Fig. 2 is a plan view of the mechanism for one of the lamps showing the upper section of the housing for said mechanism removed.

Fig. 3 is a vertical sectional view taken on line 3—3 of Fig. 2 looking in the direction indicated by the arrows but illustrating the upper section of the housing in place on the lower section of the same.

Fig. 4 is a plan sectional view taken on line 4—4 of Fig. 3 looking in the direction indicated by the arrows.

Fig. 5 is a view similar to Fig. 2 but showing a modification in the means for returning the lamp supporting shaft to its normal position.

Fig. 6 is a plan sectional view taken on line 6—6 of Fig. 7 looking in the direction indicated by the arrows.

Fig. 7 is a vertical sectional view taken on line 7—7 of Fig. 8 as indicated by the arrows.

Fig. 8 is a vertical sectional view taken on line 8—8 of Fig. 7 looking in the direction indicated by the arrows.

Fig. 9 is a vertical sectional view taken on line 9—9 of Fig. 5 but showing the upper section of the housing in position on the lower section thereof.

Fig. 10 is a plan view of a portion of the steering rod with one of the adjustable brackets carrying an adjustable operating member for the finger or lever on the lower portion of the primary lamp turning shaft mounted thereon, and illustrating the relative normal positions of said parts.

Fig. 11 is a side view partly in section thereof, and

Fig. 12 is a detached perspective view of one of the brackets for one of the adjustable sleeves for one of the supporting tubes of the mechanism.

Corresponding numerals of reference refer to like parts throughout the different views of the drawings.

When our mechanism is used on automobiles, for which it is especially intended, we by preference locate one of the mechanisms near each of the front wheels of the automobile at the inner sides of said wheels, but as each of the mechanisms is identical in construction but lefts and rights, we have shown only one of them in detail, as a duplicate showing thereof is deemed unnecessary.

Referring now more particularly to Figs. 1 to 4 inclusive and 10 to 11 of the drawings, the reference numeral 15 designates the front axle of an automobile, which is provided as usual with wheels 16 of the ordinary or well-known construction, which wheels are steered by means of a horizontally disposed and longitudinally movable steering rod 17 which is connected at its ends in the well-known way to the said wheels, it being understood that the rod 17 has connected thereto a rod extended into the body of the automobile for the purpose of shifting the rod 17 back and forth.

Mounted on each side of the frame or chassis, which is supported by springs 19 in the ordinary way or usual manner, is a mudguard 20 each of which extends outwardly over the front wheels. Each of these guards is as usual provided with an inwardly and downwardly inclined portion 21 on its part adjacent to the front portion of the body of the automobile or rather the radiator thereof. Mounted on the inclined portion 21 of each of the mudguards 20 is a bracket 22 which is provided with an inclined base 23 from which is extended upwardly a pair of spaced apart flanges 24 at least one of which is provided near its upper inner end with a slot 25 and below said slot with an opening 25ª for a pivoting screw or bolt 26. Located vertically between each pair of the flanges 24 is a hollow sleeve 27 which is by preference rectangular in shape and of a sufficient length to extend from the lower end of the base 23 of the bracket upwardly between the flanges 24 a suitable distance.

The sleeve 27 is pivotally held by means of the pivot bolts 26 so that said sleeve can be adjusted laterally between the flanges 24 where it can be secured in its adjusted position by means of set screws 28 extended through the slots 25 and engaging the sleeve.

Longitudinally located in the sleeve 27 of each of the brackets is a supporting tube 29 which has its lower end located a suitable distance above the steering rod 17 as is clearly shown in Fig. 11 of the drawings, and rearwardly of the front axle. The upper end of the supporting tube 29 extends through and a short distance above the upper end of the sleeve 27 and has rigidly secured thereon the lower section 30 of the container for the parts of the mechanism employed for rotating the headlight lamp 31 supported above the housing and operated in the manner to be presently explained.

As shown, the lower section 30 of the container is substantially concavo-convex in shape with its cavity presented upwardly and has its lower portion provided with a depending boss or thickened part 32 through which is extended a vertical opening 33 for the upper end of the supporting tube 29 which may be firmly held in said opening by means of a set screw 34 located in a suitable opening in the boss or enlargement 32 as is clearly shown in Fig. 3 of the drawings. Located in the tube 29 and extending through both ends thereof is a drive or primary shaft 35 employed in conjunction with other elements or members for supporting and turning the lamp. Interposed between the upper end of the tube 29 and the upper portion of the rotary shaft 35 is a bushing 36, and surrounding the lower end of the tube 29 is a cap or collar 37 which is fixed to the tube by means of one or more set screws 38 seated therein. The lower portion of the cap or collar 37 has an inturned annular flange 39 which fits closely around the shaft 35 near its lower end so as to exclude grit, dust, and the like from the inner portion of the collar 37 and the tube 29. As is clearly shown in Fig. 11 of the drawings, the cavity of the collar 37 has fitted therein a race member 39ª between which and another race member 40 surrounding the shaft 35 at the lower end of the tube 29 is interposed anti-friction balls 41 to provide a thrust bearing for said shaft.

Fixed on the shaft 35 by means of a pin 42 or otherwise is a horizontally extended finger 43 which as shown lies transversely with respect to the steering rod 17 and above the same, as will be readily understood by reference to Figs. 10 and 11 of the drawings. The upper edge of the section 30 of the container or housing is provided with a peripheral flange 44 to which a similar flange 45 on the upper section 46 of the housing may be bolted. The upper section 46 is substantially concave-convex in shape and has its cavity presented downwardly as shown in different views of the drawings. The upper end of the section 46 is provided with an opening 47 in which is located a race member 48 between which and another race member 49 surrounding an auxiliary lamp supporting and turning shaft 50 is interposed anti-friction balls 51 to provide a thrust bearing for the upper portion of the last named shaft.

The lower section 30 of the container is provided on its inner surface with a pair of opposed and inwardly extended lugs 52 for horizontally supporting a bridge member 53 and said section has on its outer front portion a transversely apertured lug 54 to receive one end of the tierod 55 used to connect the containers transversely and to brace and afford additional stability to the supports for the mechanisms. As shown in Figs. 2 and 3 of the drawings the bridge 53 is secured to the lugs 52 by means of bolts 56 and has a rearwardly extended arm 57 provided with a longitudinal slot 58 extended from near the inner end to the outer end of said arm.

The bridge 53 is provided with a vertical opening 59 through which is extended the lower portion of the auxiliary shaft 50, the lower end of which shaft is provided with a reduced and rounded end bearing post 60 fitted in a bearing socket 61 in the upper end of the master or drive shaft 35 as shown in Fig. 3 of the drawings. Mounted on the upper surface of the bridge 53 and surrounding the shaft 50 to which it is rigidly secured by means of a set screw 62 is a collar 63 which has diametrically opposed arms 64 to contact with posts or screws 65 extended upwardly from the bridge 53 so as to act as stops for said collar.

Secured at one of its ends to each of the posts 65 is a spring 66 the other end of each of which springs is secured to a screw or post 67 which are diametrically located on the collar 63 between the arms 64 thereof. By this arrangement it is obvious that when the shaft 50 is turned in the direction indicated by the arrow in Fig. 2 of the drawings, which operation will be performed by the movement of the steering rod and the mechanism connecting said rod to the shaft 50, said movement will be against the tension of the springs 66 and that as soon as the steering rod is disconnected from the shaft 50 said shaft will be automatically rotated in the opposite direction by the action of the springs 66 until checked by the arms 64 contacting with the screws or posts 65 on the bridge, at which time the lamp 31 fixed to the upper end of the shaft 50 will occupy its normal position.

Surrounding the shaft 50 just below the bridge 53 and fixed to said shaft by a set screw or pin 68 is a member 69 which has a pair of spaced apart radial extensions or lugs 70 located one above the other and directly beneath the arm 57, see Figs. 3, 6 and 7 of the drawings. Each of the lugs 70 is provided with a vertical opening 71 for the reception of a pin or bolt 72, on which pin is pivotally mounted one end of a segmental link or bridle 73 which has near its opposite end an opening 74 for the reception of a pin 72$^a$. Surrounding the upper end of the shaft 35 and fixed to said shaft by means of a pin or set screw 75 is a collar 76 of an eccentric arm 77 extended therefrom, which arm is provided with an eccentric or cam slot 78 for the reception and operation of a roller 79 which is mounted on the pin 72$^a$, below the link 73 of the member 69, and may be held in place thereon by means of a washer 80 and a cotter-pin 81, the latter being located in a suitable transverse opening in the lower portion of said pin. That portion of the pin located in the slot 58 of the arm 57 is provided with a roller 82 which is also held in place by similar means to that shown on the lower portion of the pin 72$^a$ and above mentioned.

In the construction shown in Figs. 1 to 4 inclusive, an anti-friction ball bearing consisting of a race member 83 surrounding the upper portion of the shaft 35 and resting on the bottom of the section 30 of the container, another race member 84 surrounding said shaft and resting against the lower surface of the member 76, and anti-friction balls 85 interposed between said members is employed. In the last above mentioned views of the drawings, as well as in Fig. 6, it will be observed that the lower section 30 is provided below its flange 44 and to one side of its external lug 54, with an opening 86 which is covered by a transparent bulls-eye 87 of red color to indicate danger, and that near said opening the section 30 is provided internally with an inwardly extended arm 88 which carries a socketed part 89 in which is fitted an electric lamp 90 which is connected by conductors 91 to a source of electric supply, not shown. Mounted on the arm 88 but insulated therefrom are the blades 92 of an ordinary knife switch between which blades a knife 93 mounted on and extended laterally from the collar 76 of the eccentric arm 77, is adapted to pass and contact therewith in the movement of said arm and thus complete the electric circuit to illuminate the lamp.

In Figs. 5 to 9 inclusive, is illustrated a modification in the construction and arrangement of the mechanism, which consists in employing a container made and mounted in a manner similar to that shown in Figs. 1 to 4 inclusive, and above described, except, that the auxiliary lamp 90 and its operative equipment may be omitted. In this modification, parts of substantially the same construction as before described are employed, but they are differently arranged, yet accomplish the same results. A bridge 53 is supported horizontally on the lugs 52 in the lower section 30, as before described, but the slotted arm or extension 57 of the other construction is omitted therefrom and an arm 57$^a$ having a longitudinal slot 58$^a$ and provided with transversely apertured clamping members 94, is mounted on the shaft 50 directly below the bridge 53 and rigidly clamped on said shaft by means of the members 94 and a screw 95 engaging them.

Surrounding the shaft 50 and lying on the bridge 53 is a race plate 96 between which and another race plate 97 surrounding said shaft and located at the bottom of a collar 98 fixed to the shaft 50, is a series of anti-friction balls 99 which parts provide a bearing for the support of the mechanism, which bearing is located on and above the bridge 53 instead of at the bottom of the section 30 in the other described construction. Mounted on the shaft 50 above the collar 98 and fixed to said shaft by a pin or screw 100 is a collar 101 which has an annular groove 102 for a single spring 103 which has one of its ends secured to a screw or pin 104 on said collar and its other end fastened to a screw or pin 105 extended upwardly from the bridge. The collar 98 has a projection 106 to strike against the projection 105 so as to check the rotation of the shaft 50 and to hold it and its parts in their normal positions. Loosely mounted at its upper portion 106$^a$ on the shaft 50 directly below the slotted member 57$^a$ is a cage, consisting of the upper circular part 106$^a$ having extended therefrom an eccentric arm 77$^a$ provided with a cam or eccentric slot 78$^a$ and a hub 107 spaced from and below the part 106$^a$ but united thereto by spaced apart connections 108 and lateral extensions 109 on said hub. This hub is fixed to the upper end of the shaft 35 by a pin or screw 110 as shown in Figs. 7, 8 and 9 of the drawings, in which views it will be seen that the collar or member 69 having the spaced lugs 70 is fastened to the shaft 50 by the pin 68 and supports the upper circular part 106$^a$ of the cage. The bridle or link 73 is pivotally mounted at one of its other ends on the lower end of the pin 72$^a$ and below the member 77$^a$ instead of above the corresponding member 77 as shown in Figs. 2 to 4 inclusive.

In the construction now being described, it will be seen and understood that a single spring 103 only is employed and that the end thrust bearing is located above the bridge, instead of at the bottom of the housing, as in the other construction. It will be further seen and understood that the pin 72$^a$ connecting the link or bridle 73 with the members 57$^a$ and 77$^a$ is equipped with rollers 82 and 79 for the slots of said members respectively, and that it may be held in place at its upper end by means of a washer 80 and cotter-pin 81, and at its lower end by means of a head 111 or otherwise.

Referring now to Figs. 10 and 11 of the drawings: transversely and adjustably mounted on the steering rod 17 at one side of the lever or finger 43 on the lower part of each of the drive shafts 35, but below the same is a bracket which consists of a pair of clamping members 112 and 113, which have in their adjacent surfaces curved recesses 114 to receive said rod and are clamped thereon by means of screw bolts 115 extended through suitable openings in one of said members and engaging the other one. The member 112 is provided near one of its ends with a vertical opening 116 which has communicating therewith another bore or opening 117, which is located at a right angle to the first named opening.

Located in the opening 117 at its inner end is a pin or bolt 118 which has its end adjacent to the opening 116 rounded. Located in the outer end of the opening 117 is an adjusting screw 119, between which and the pin 118 is interposed a spiral spring 120 the tension of which can be regulated by turning the screw 119 in the proper direction. Vertically located in the opening 116 is a trip-lever carrying releasing post 121 which has in its portion within the opening 116 and adjacent to the intersecting bore 117, a plurality of pits 122 or depressions arranged in a circumferential row to alternately receive the spring pressed bolt. The rod 121 has an annular flange 123 to rest on the upper end of the member 112 of said bracket and may be secured in place thereon by means of a washer 124 surrounding its lower end and a pin 125 located in a transverse opening in the rod below said washer.

Adjustably mounted on the rod 121 is a cross-coupling 126 which carries a trip lever 127 for operating the lever or arm 43 of the drive shaft of the mechanism. The coupling 126 is, by preference, made of a single piece of material, and has a vertical opening 128 for the post or rod 121 and a horizontal opening 129 for the horizontal portion of the trip lever 127, which it will be understood is of an elbow shape, or has an upright extension 130 to contact with or strike the lever 43. The coupling 126 is provided on opposite faces with one or more set screws 131 by means of which it can be suitably adjusted on the rod 121, and by means of which the trip lever 127 can be longitudinally adjusted as is apparent.

Again referring to Fig. 1, it will be understood that the supporting tubes 29 can be vertically adjusted through the sleeves 27 by means of the set screws 27$^a$ seated in their adjacent surfaces.

As is clearly shown in Fig. 11 of the drawings, the post 121 is provided with at least a pair of pits or depressions 122 located side by side but spaced apart so that said posts and the trip-lever 127 thereon can be turned to about the position shown by dotted lines in Fig. 10, when it is apparent that the bolt 118 will be removed from one of the depressions 122 and received by another of said depressions, when said lever will be held in such position that it will not engage the finger 43, which will be the case in day time or when a light is not required.

To extend the member 127 and its arm 130 into operative position, it is only necessary to turn it on its post, when it is apparent that the bolt 118 will be pressed against the spring 120 and will be so held until another one of the pits is brought into register with the opening 117 in the member 112, thus holding the lever 127 in the position shown by continuous lines in Fig. 10 of the drawings, when it is apparent it will be in position to contact with the finger 43 and to turn the shaft 35 and the lamp 31 to the left, through its connections with said shaft, when the steering rod 17 is shifted in the direction indicated by the arrow in Fig. 10. In this movement it will be understood that the other trip-lever 127 and its extension 130 will be removed from the finger 43 on the other shaft 35 which shaft and the lamp carried thereby will remain in a stationary position.

It will be observed in Fig. 10 that the portion of the extension 130 adjacent to the finger 43 is rounded. It is also apparent that in case of accident or any other cause, the finger or fingers should be prevented by the lever or levers 127 and their extensions 130 from returning to a normal position, a quick jerk on the steering wheel will force the finger or fingers to its or their normal positions and the lamp or lamps will assume their normal positions, and the steering mechanism will have freedom of action for directing the apparatus in any direction. By means of the eccentric connecting mechanism which unites the upper and lower shafts of the device, it is obvious that differential rotative movement to said shafts will be imparted and that the upper shaft which carries the lamp will be rotated farther than the primary or drive shaft.

Having thus fully described our invention, what we claim as new and desire to secure by Letters Patent is—

1. A device of the character described, including in combination, a pivoted finger, a longitudinally shiftable rod located transversely with respect to the finger, a bracket transversely disposed on and rigidly fixed to said rod, a vertically disposed post rotatably mounted on said bracket, means carried by the bracket to limit the rotary movement of said post, a coupling adjustably mounted on the post, and a trip lever horizontally secured to the coupling and having at one of its ends an extension extended at a right angle therefrom for loose contact with said finger.

2. A device of the character described, including in combination, a longitudinally disposed pivoted finger, a longitudinally shiftable rod located transversely with respect to said finger, a horizontally disposed bracket rigidly secured to the rod, a vertically disposed post mounted for rotative movement on said bracket, automatic means for controlling the movement of said post, a coupling having a transverse sleeve and mounted for adjustment on said post, and an L-shaped trip lever adjustably secured in the sleeve for loose contact with said finger.

3. A device of the character described, consisting of an automobile having a steering mechanism thereon, a closed container suitably mounted on the automobile, a vertically disposed shaft extended vertically into said container, a lamp rigidly mounted on the upper portion of said shaft, the said shaft terminating at its lower end below the middle of the container and mounted for rotative movement therein, a drive shaft having a transversely disposed finger thereon and extended vertically through the bottom of the container and terminating at its upper end below the center thereof, said drive shaft mounted for rotative movement in alinement with the first named shaft, operative connecting means mounted in the container on said shafts for differential relative movement of the same, means on the steering mechanism for turning the finger and shafts in one direction, and connecting automatic means in the container for turning the shafts in the opposite direction from that attained by the last named means.

4. A device of the character described, including in combination, two vertically disposed shafts mounted for rotative movement and in alinement with one another, operative connecting means on the shafts for differential limited rotative movement of the same, a lamp rigidly mounted on the upper shaft, operative automatic means on said shaft for turning the shafts in one direction, and means on the lower shaft for turning the shafts in the opposite direction of that attained by the automatic means.

5. A device of the character described, including in combination, a hollow container suitably mounted on an automobile, a lamp carrying shaft and a drive shaft mounted in alinement and for rotative movement in said container and extended through the upper and lower walls of the same, loosely connecting means on the shafts within the container for imparting differential rotative movement to said shafts, and means on the drive shaft below the container for rotating said shafts.

6. A device of the character described, consisting of an automobile and a lamp carrying shaft suitably mounted thereon, a drive shaft mounted in alinement with the first named shaft and eccentrically connected for rotative movement thereof, a finger extended horizontally from the drive shaft, a steering mechanism having a horizontally disposed bracket thereon, a vertically disposed post on said bracket, and a lever extended therefrom for contact with said finger for movement of the same.

7. A device of the character described, including in combination, a suitably mounted closed container, a vertically disposed shaft extended through the upper wall of the container and mounted for rotative movement therein, a lamp on said shaft, a vertically disposed shaft having a transversely disposed finger on one of its ends, the other end thereof extended through the lower wall of the container in alinement with the first named shaft and terminating near the same, said shaft being mounted for rotative movement, and operating means for connecting the said shafts for differential relative movement of the same.

8. A device of the character described, consisting of an automobile having a steering mechanism thereon, a closed container rigidly mounted on the automobile, a vertically disposed shaft having a lamp thereon and extended through the upper portion of the container and terminating near the center thereof, said shaft mounted for rotative movement in the container, a drive shaft having a transversely disposed finger thereon and extended through the lower portion of the container in alinement with and terminating near the first named shaft, said drive shaft being mounted for rotative movement, operating means connecting the said shafts for differential relative movement of the same, and means on the steering means for turning the finger in one direction.

9. A device of the character described, consisting of an automobile having a steering mechanism, a hollow container with a detachable cover rigidly mounted on the automobile, a shaft extended vertically through the cover and terminating near the center of the container and mounted thereon for rotative movement, a lamp rigidly mounted on said shaft, a drive shaft having a transversely disposed finger thereon and extended through the bottom of the container in alinement with the first named shaft, said shaft terminating near the first named shaft and mounted for rotative movement, eccentric means connecting the shafts for differential rotative movement of the same, means on the steering mechanism for turning the finger and shafts in one direction, and automatic means for turning the shafts and finger in the opposite direction attained by the last named means.

10. A device of the character described, including in combination, a pair of vertically disposed shafts mounted in alinement and for rotative movement, a lamp rigidly secured to the top shaft of said shafts, operative connecting means on the shafts for limited and differential movement of the same, operative connecting means with the bottom shaft for turning the shafts in one direction, and automatic means on the top shaft for turning the said shafts in the opposite direction.

11. A device of the character described, including in combination, two vertically disposed shafts mounted in alinement and for rotative movement, a lamp rigidly secured to the upper shaft, means connecting the shafts for differential rotative movement thereof, a horizontally disposed finger rigidly secured to the lower shaft, a steering mechanism for an automobile, means on said mechanism for turning the finger and shafts in one direction, and connecting automatic means for turning the shafts and finger in the opposite direction.

12. A device of the character described, including in combination, two vertically disposed shafts mounted in alinement and for rotative movement, a lamp rigidly secured to the upper shaft, said shafts and lamp being operatively connected, means on the shafts for limited and differential movement of the same, operative connecting means consisting of a horizontally disposed finger rigidly secured to the bottom shaft, a longitudinally shiftable rod located transversely with respect to the finger, a transversely disposed bracket rigidly secured to said rod, a vertically disposed post mounted for rotative movement on the bracket, means on the bracket to limit the movement of said post, a coupling mounted on the post, a horizontally disposed member rigidly secured in the coupling and provided at one of its ends with an extension for operating connection with the finger for turning the shafts in one direction, and automatic means for turning the shafts in the opposite direction.

13. A device of the character described, including in combination, a mud-guard having an opening in the sloping side thereof, an oblong bracket having a base section provided with an opening therein for register with the opening in the mud-guard and mounted transversely on the sloping wall of said guard and provided with two spaced apart vertically disposed flanges, each of said flanges having an elongated slot, a sleeve pivoted between said flanges for lateral adjustment, and connecting means with said sleeve and slots for clamping the sleeve in a vertical position.

14. A device of the character described, including in combination, a mud-guard having an opening in the inclined portion thereof, an oblong bracket having a base provided with an opening therein to register with the first named opening and mounted transversely on the inclined wall of said guard and provided with a pair of spaced apart vertically disposed flanges, each of said flanges having an elongated slot, a sleeve pivotally mounted between said flanges for lateral adjustment, connecting means with said sleeve and slots for clamping the sleeve in a vertical position, and a tube rigidly secured in the sleeve and extending through said openings.

15. A device of the character described, including in combination, a mud-guard having an opening in the side wall thereof, an oblong bracket having a base provided with an opening therein to register with the first named opening and mounted transversely on said guard and provided with two spaced apart vertically disposed flanges, each of said flanges having an elongated slot, a sleeve pivotally mounted between said flanges for lateral adjustment, connecting means with said sleeve and slots for clamping the sleeve and securing the same in an adjusted position, a tube rigidly secured to the sleeve and extended a desired distance below said openings, a closed container rigidly mounted on the upper end of said tube, a shaft extended into the container and mounted therein for rotative movement, a lamp on the upper end of said shaft, another shaft having a finger mounted transversely thereon, said shaft extended upwardly through said tube and sleeve and terminating in the container near and in alinement with the first named shaft and eccentrically connected therewith for differential relative movement of the said shafts, a steering mechanism, means on said mechanism for loose action with said finger for moving the same and turning the shafts in one direction, and automatic means in the container for turning the shafts and said finger in an opposite direction.

OLIVER D. EASTMAN.
WALTER M. GREGG.